UNITED STATES PATENT OFFICE.

HENRY HARRIS, OF LONDON, ENGLAND.

DEZINCING LEAD.

1,395,820.  Specification of Letters Patent.  Patented Nov. 1, 1921.

No Drawing.  Application filed January 29, 1920. Serial No. 354,851.

*To all whom it may concern:*

Be it known that I, HENRY HARRIS, a subject of the King of Great Britain, residing in London, England, have invented certain new and useful Improvements in the Dezincing of Lead, of which the following is a specification.

Several reagents have been suggested for dezincing lead, among them caustic soda; this reagent, however, is not particularly active and parts with sodium to the lead. A mixture of zinc chlorid and litharge is effective, but the litharge must be free from silver and therefore expensive.

I have found that a fused alkali chlorid will react with molten lead containing zinc to remove the latter from the lead. The temperature required, however, is so high that loss of lead occurs and alkali metal passes into the lead from which it cannot easily be eliminated.

My invention consists in avoiding these objections by using in conjunction with the alkali chlorid a substance or substances which reduce its melting point. Preferably the melting point of the reagent thus formed should not exceed 500° C.

A mixture of caustic alkali and alkali chlorid is particularly useful since the mixture does not part with sodium to the lead at the temperature at which it can be used, and the reaction which removes the zinc is not dependent on oxygen other than that contained in the mixture, although oxygen added in the form of litharge or air hastens the process.

Zinc chlorid also lowers the melting point of the alkali chlorid and may advantageously be used when the addition of oxygen or a source of oxygen, such as litharge or of air, is not objectionable. In this case the mixture is more effective than the known reagent consisting of zinc chlorid and litharge alone and less costly in zinc chlorid since the latter does not volatilize so readily when used in conjunction with alkali chlorid.

The following examples illustrate the invention:—

(1) A mixture of 24 lbs. of sodium chlorid and 25.5 lbs. of caustic soda is brought into intimate contact (such as by the method described in my application for U. S. Patent Serial No. 354,852) with 4 tons of lead containing 0.65 per cent. of zinc, heated to about 500° C. The zinc is chloridized and oxidized and is found as a scum or dross mixed with the reagent.

(2) The lead to be dezinced is brought into intimate contact at a temperature about 500° C. with the double chlorid of zinc and sodium amounting to 3.6 times the weight of the zinc contained in the lead. Air is either blown through the lead during the operation or supplied in the manner described in my application for U. S. Patent, Serial No. 354,852. The oxidized and chloridized zinc is removed as referred to in Example 1. The reagent is not exhausted by a single treatment and may be used again.

Having thus described the nature of the said invention and the best means I know of carrying the same into practical effect, I claim:—

1. In the process of dezincing lead, heating the molten lead with a molten mixture of an alkali chlorid and a substance or substances which lower the melting point of the alkali chlorid.

2. A process of dezincing lead which consists in bringing the molten lead into intimate contact with a molten mixture of alkali chlorid and caustic alkali.

3. A process of dezincing lead which consists in bringing molten lead into intimate contact with a molten mixture of alkali chlorid and zinc chlorid in presence of oxygen or a source of oxygen.

In testimony whereof I have signed my name to this specification.

HENRY HARRIS.